(12) United States Patent
Lerosey et al.

(10) Patent No.: US 12,117,517 B1
(45) Date of Patent: Oct. 15, 2024

(54) RADAR DEVICE

(71) Applicant: Greenerwave, Paris (FR)

(72) Inventors: Geoffroy Lerosey, Paris (FR); Mathieu Durand, Paris (FR); Mikhail Odit, Paris (FR); Rémi Faggiani, Charenton-le-pont (FR); Victor Barolle, Paris (FR); Uladzislau Papou, Paris (FR)

(73) Assignee: Greenerwave, Paris (FR)

( * ) Notice: Subject to any disclaimer, the term of this patent is extended or adjusted under 35 U.S.C. 154(b) by 0 days.

(21) Appl. No.: 18/639,952

(22) Filed: Apr. 18, 2024

(51) Int. Cl.
*G01S 13/42* (2006.01)
*G01S 7/03* (2006.01)
*G01S 13/931* (2020.01)

(52) U.S. Cl.
CPC ............ *G01S 13/426* (2013.01); *G01S 7/032* (2013.01); *G01S 13/931* (2013.01)

(58) Field of Classification Search
CPC .......... G01S 13/42; G01S 13/426; G01S 7/03; G01S 7/032; G01S 13/931
See application file for complete search history.

(56) References Cited

U.S. PATENT DOCUMENTS

| | | | | |
|---|---|---|---|---|
| 5,717,399 A * | 2/1998 | Urabe | ...................... | H01Q 3/24 |
| | | | | 342/87 |
| 9,322,911 B1 * | 4/2016 | Sacco | .................. | H01Q 21/205 |
| 10,033,082 B1 * | 7/2018 | Izadian | .................... | H01P 5/12 |
| 11,152,701 B2 * | 10/2021 | Wang | ...................... | H01Q 1/425 |
| 11,616,291 B1 * | 3/2023 | Izadian | .................... | H01Q 21/20 |
| | | | | 343/702 |
| 2003/0146826 A1 * | 8/2003 | Viana | ...................... | G01S 13/87 |
| | | | | 340/436 |
| 2004/0263408 A1 * | 12/2004 | Sievenpiper | ......... | H01Q 19/104 |
| | | | | 342/372 |
| 2012/0050091 A1 * | 3/2012 | Inami | .................... | H01Q 21/061 |
| | | | | 342/107 |
| 2016/0047893 A1 * | 2/2016 | Izadian | ................ | H04B 7/0617 |
| | | | | 342/368 |
| 2016/0054439 A1 * | 2/2016 | Brookner | ................ | G01S 13/91 |
| | | | | 342/36 |
| 2018/0013208 A1 * | 1/2018 | Izadian | ................ | H01Q 9/0407 |
| 2018/0210079 A1 * | 7/2018 | Hammerschmidt | .. | G01S 13/931 |
| 2019/0140344 A1 * | 5/2019 | Kirino | ........................ | G01S 7/03 |
| 2019/0305437 A1 * | 10/2019 | Hamminga | .............. | H01Q 1/52 |
| 2019/0324134 A1 * | 10/2019 | Cattle | ..................... | G01S 7/024 |
| 2020/0309900 A1 * | 10/2020 | Brune | .................... | G01S 13/931 |
| 2021/0167873 A1 | 6/2021 | Lerosey et al. | | |
| 2021/0203065 A1 | 7/2021 | Stephan et al. | | |
| 2021/0239822 A1 * | 8/2021 | Vollbracht | ............ | G01S 13/426 |
| 2021/0313701 A1 | 10/2021 | Lerosey et al. | | |

(Continued)

FOREIGN PATENT DOCUMENTS

WO      2020174151 A1     9/2020

*Primary Examiner* — Peter M Bythrow
(74) *Attorney, Agent, or Firm* — Daylight Law, P.C.

(57) ABSTRACT

A radar device comprising a controller module, a radiofrequency module, a plurality of waveguides, a plurality of antenna modules, each antenna module of the plurality of antenna modules having a controllable electromagnetic surface, wherein the controller module is calculating a radar image on the basis of the received data from the radiofrequency modules, antenna parameters applied to each antenna module to tune each controllable electromagnetic surface, and radar parameters.

16 Claims, 2 Drawing Sheets

(56) References Cited

U.S. PATENT DOCUMENTS

| | | | |
|---|---|---|---|
| 2021/0376486 A1* | 12/2021 | Williams | H01Q 3/2682 |
| 2022/0026524 A1* | 1/2022 | Maruyama | H01Q 1/32 |
| 2022/0037784 A1 | 2/2022 | Wang | |
| 2022/0044359 A1 | 2/2022 | Harrison et al. | |
| 2022/0121829 A1* | 4/2022 | Lerosey | G06K 7/10475 |
| 2022/0342035 A1* | 10/2022 | Smith | G01S 13/426 |
| 2023/0275336 A1* | 8/2023 | Wintermantel | G01S 13/931 |
| | | | 343/700 R |
| 2024/0145932 A1* | 5/2024 | Williams | H01Q 17/00 |

\* cited by examiner

RADAR DEVICE

FIELD OF THE INVENTION

The present invention concerns a radar device, for example used in a vehicle.

BACKGROUND OF THE INVENTION

Conventional beamforming radar comprises a plurality of transceivers, each transceiver being connected to an antenna element. The beamforming radar needs numerous transceivers and antenna elements to control the radiated beam of electromagnetic wave to scan accurately a wide field of view. Then, the number of signals to or from said transceivers also leads to high computation load for beamforming processing.

For example, such beamforming radar devices use transceivers chipsets with multiple transmit Tx and multiple receive Rx channels or a cascaded configuration that requires more transceivers chipsets and that requires synchronization between these chipsets to work properly.

All this hardware of transceivers and beamforming processing generates high cost, high power consumption and low heat dissipation. Moreover, this provides a low spatial resolution. There is great need especially in automotive or vehicle use of having low cost, low power consumption and accurate radar devices.

OBJECTS AND SUMMARY OF THE INVENTION

One object of the present invention is to provide a radar device having a new architecture. To this effect, the radar device comprises:

- a controller comprising a processor and a memory,
- a radiofrequency module comprising a plurality of transceivers adapted for transmitting or receiving electromagnetic waves,
- a plurality of waveguides, each waveguide of the plurality of waveguides being coupled at a first end of said waveguide to one transceiver of the radiofrequency module, for transmitting or receiving an electromagnetic wave to or from said waveguide,
- a plurality of antenna modules, each antenna module of the plurality of antenna modules being coupled at a second end of one waveguide, for transmitting or receiving the electromagnetic wave between the waveguide and said antenna module, and
- each antenna module having a controllable electromagnetic surface illuminated by the electromagnetic wave to or from the waveguide, wherein

- the controller is connected to the radiofrequency module via a data link to exchange wave data from said radiofrequency module, so that each transceiver can transform said wave data into the electromagnetic wave or transform the electromagnetic wave into wave data, and
- the controller is connected to each antenna module via an antenna link to apply antenna parameters to each antenna module for tuning the controllable electromagnetic surface of each antenna module,
- the controller is scanning a field of view in front of the antenna modules by applying successively a plurality of antenna parameters to each antenna module of the plurality of antenna modules,
- the controller is calculating a radar image on the basis of the wave data received from the radiofrequency module, the antenna parameters successively applied at each antenna module, and radar parameters.

Thanks to these features, the radar device uses few controllable antenna modules and transceivers. The antenna modules are tunable to increase controllability of beams from said antenna modules. The radar device of the present disclosure is using less radiofrequency transceivers and is therefore less costly than prior beamforming radar devices.

Moreover, such new radar architecture is modular. The antenna modules can be easily integrated into a device separated from the controller and the radiofrequency module, thanks to the waveguides.

Moreover, the new radar architecture is easily upgradable, or even reconfigurable for various uses.

In various embodiments of the radar device, one and/or other of the following features may optionally be incorporated:

According to a configuration, the radio frequency module further comprises a waveguide multiplexer comprising a plurality of elements chosen in a list of switches, circulators configured to interconnect transceivers and first ends of waveguides, said elements being controlled by configuration data received from the controller.

According to a configuration, each waveguide is a flexible waveguide.

According to a configuration, each waveguide is of a type chosen in a list comprising a leaky waveguide, dielectric cables or waveguides, microstrips, coaxial cables, plastic waveguides, flexboard waveguides, and stack materials waveguide.

According to a configuration, each waveguide comprises at the second end a slit for illuminating the electromagnetic wave towards the controllable electromagnetic surface of the antenna module coupled to said waveguide.

According to a configuration, each antenna module comprises a reflection cavity and an opening, the electromagnetic wave inside the cavity of the antenna module being multiple times reflected inside said reflection cavity to impact a plurality of times the controllable electromagnetic surface before exiting the reflection cavity by the opening or by the waveguide.

According to a configuration, the controllable electromagnetic surface of each antenna module comprises a plurality of controllable elements, each controllable element being tunable by a parameter of the antenna parameters.

According to a configuration, each antenna module comprises a main module direction in which said antenna module has the greatest size.

According to a configuration, the controllable elements are aligned according to the main module direction, or the controllable elements are organized in an array of elements, having a plurality of rows aligned according to the main module direction.

According to a configuration, at least a group of two antenna modules, the antenna modules of said group each having a main module direction in which each antenna module has the greatest size, the main directions of the two antenna modules being angled by a predetermined angle comprised between 10 degrees and 30 degrees.

According to a configuration:
- the memory of the controller stores the antenna parameters for the tuning of the controllable electromagnetic surface of each antenna module, and the processor sends to each antenna module the determined antenna parameters, so as to apply the antenna parameters to each antenna module.

According to a configuration:
the memory of the controller stores the antenna parameters for the tuning of the controllable electromagnetic surface of each antenna module, and stores identifiers of these antenna parameters,
each antenna module comprises a memory to store the same antenna parameters and identifiers of the corresponding antenna parameters, and
the processor of the controller sends to each antenna module a determined identifier of antenna parameters, so as to apply the antenna parameters to each antenna module.

According to a configuration, the processor of the controller is successively:
applying the antenna parameters of each antenna module,
waiting for an acknowledgment of success of the applying of said antenna parameters to the antenna modules, and
sending wave data to the radiofrequency module.

According to a configuration, the radar parameters comprise positions of antenna modules.

According to a configuration, the positions of antenna modules are determined by the controller scanning the antenna modules one after the other.

BRIEF DESCRIPTION OF THE DRAWINGS

Other features and advantages of the invention will be apparent from the following detailed description of some embodiments given by way of non-limiting example, with reference to the accompanying drawings. In the drawings.

MORE DETAILED DESCRIPTION

Figure 1:
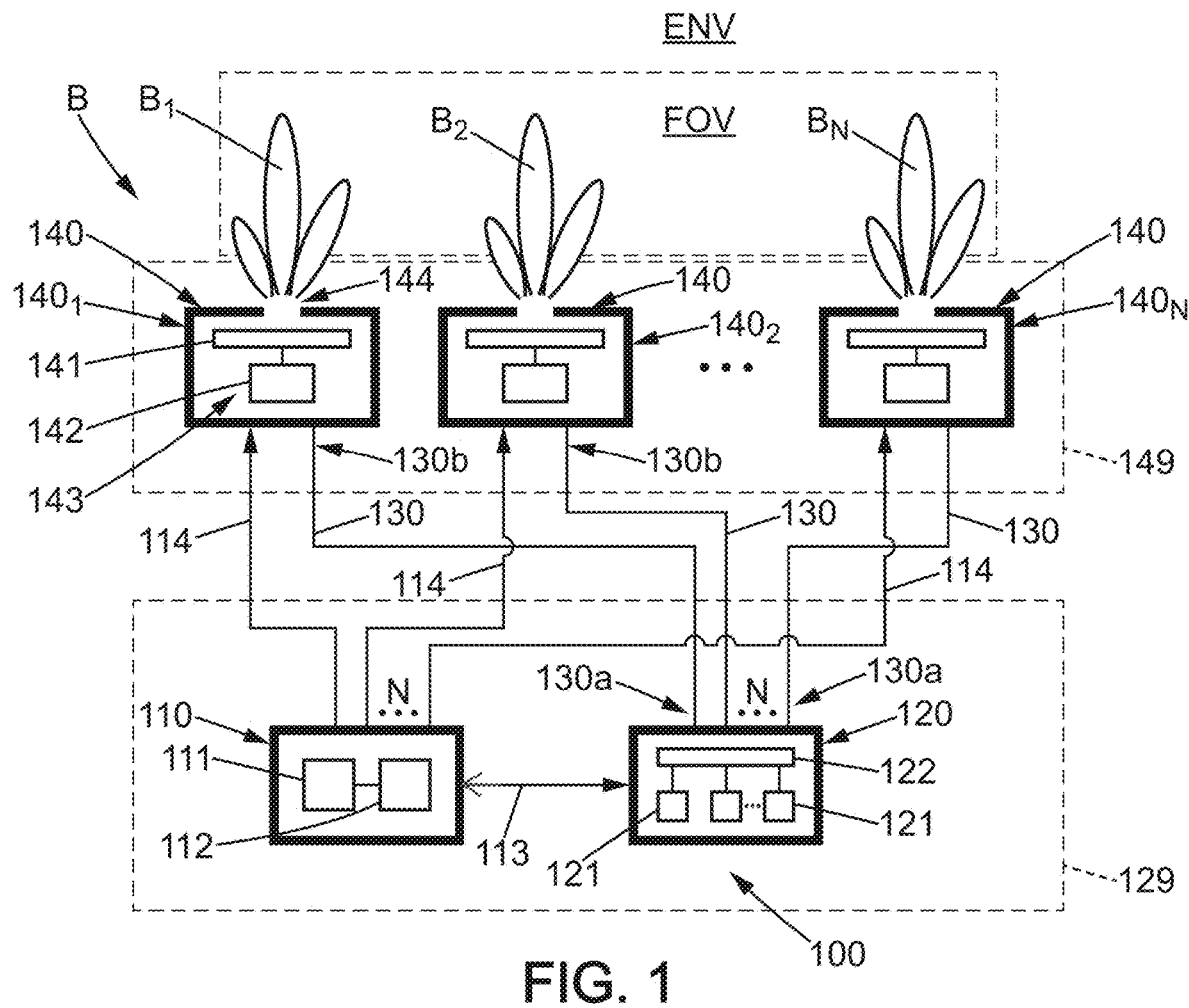
FIG. 1 is a schematic view of a radar device according to the disclosure.

The FIG. 1 illustrates a radar device 100 according to present disclosure. Such radar device 100 is transmitting (transmitted) electromagnetic waves in an environment ENV and is receiving (received) electromagnetic waves in response to the (transmitted) electromagnetic waves to sense the environment.

The environment ENV is a free space, in air, in which the electromagnetic waves are propagating forth and reflected back by a target device into said environment.

The radar device 100 comprises:
a controller 110 comprising a processor 111 and a memory 112,
a radiofrequency module 120 comprising a plurality of transceivers 121 adapted for transmitting or receiving electromagnetic wave.

The electromagnetic wave is for example in a frequency range of 50 GHz to 150 GHz. Then, the plurality of transceivers 121 is configured for transmitting or receiving radiofrequency signals in the frequency range of 50 GHz to 150 GHz.

Each transceiver 121 is a device that can transmit and/or receive one channel of electromagnetic wave. Eventually, each transceiver may group a plurality of channels. In the present disclosure, we will consider that each transceiver includes only one channel for the sake of simplicity of explanations.

Examples of transceiver chip providers companies are Texas Instruments or NXP. For example, the Texas Instruments "AWR2243 Single-Chip 76 to 81 GHz FMCW transceiver" is a common chip. FMCW means "Frequency Modulated Chirp Wave". This transceiver from Texas Instruments includes four receive channels and three transmit channels.

The radar device 100 of current disclosure further comprises:
a plurality of waveguides 130, each waveguide 130 of the plurality of waveguides being coupled at a first end 130a of said waveguide to one transceiver 121 of the radiofrequency module, for transmitting an electromagnetic wave from said one transceiver to said waveguide or for receiving an electromagnetic wave from said waveguide to said transceiver,
a plurality of antenna modules 140, each antenna module of the plurality of antenna modules being coupled at a second end 130b of a waveguide, for transmitting the electromagnetic wave from the waveguide to said antenna module or for receiving the electromagnetic wave from said antenna module to the waveguide.

Each antenna module 140 of the plurality of antenna modules may have a controllable electromagnetic surface 141 illuminated by the electromagnetic wave from the waveguide or illuminating the waveguide by an electromagnetic wave.

In the embodiment illustrated in FIG. 1, there are a number of N antenna modules 140 in the plurality of antenna modules. The antenna modules are identified with references $140_1, 140_2 \ldots , 140_N$.

The above term "coupled" should be understood as "electromagnetically coupled" as the various concerned elements (waveguides, transceivers, antenna modules) are transmitting and/or receiving electromagnetic waves.

The above term "illuminated" or "illuminating" means that an electromagnetic wave is radiated to an element, or an electromagnetic wave is radiating an element.

The controllable electromagnetic surface 141 of each antenna module 140 is a device having a plurality of controllable elements 141a, each controllable element 141a being tunable or adjustable by a parameter. An example of such controllable electromagnetic surface 141 can be found in patent application US 2004/263408 disclosing a beam forming antenna using such controllable electromagnetic surface or tunable impedance surface. A controllable electromagnetic surface 141 includes tunable impedances that are able to modify an incident electromagnetic wave into a reflected electromagnetic wave. The amplitude, phase, beam directivity or spatial radiation pattern from the controllable electromagnetic surface 141 can be modified by the parameters of controllable elements 141a.

Thanks to the waveguides 130, the controller 110 and the radiofrequency module 120 can be integrated into a first device 129, corresponding to an electronic processing device. The antenna modules 140 can be integrated to a second device 149, such as an object being viewable from the environment ENV. For example, in case of a vehicle use, the second device 149 including the antenna modules 140 can be a shock absorber of a vehicle, or a car body. Thanks to the waveguides 130, the first device 129 can be located in a predetermined location and the second device 149 can be separated and distant from the first device 129. For example, the second device 149 can be distant between 20 cm to 200 cm from the first device 129. Moreover, the various antenna modules 140 can also be separated and distant from each other. Moreover, the various antenna modules 140 can be oriented independently one to the other. The integration of the antenna modules 140 in the second device 149 (for e.g., a shock absorber in a vehicle) is then facilitated.

Thanks to the antenna modules 140 including a controllable electromagnetic surface 141, the number of transceivers 121 needed for the radar device 100 of current disclosure is reduced compared to the number of transceivers needed for a prior art radar device using an array of antennas and a beamforming processing on all channels of said array of antennas.

The controller 110 is connected to the radiofrequency module 120 via a data link 113 to transmit wave data to or to receive wave data from said radiofrequency module, so that each transceiver 121 in the plurality of transceivers 121 can transform wave data into the electromagnetic wave or can transform electromagnetic wave into wave data.

The controller 110 is connected to each antenna module 140 via an antenna link 114 to apply or set antenna parameters to each antenna module 140, and to tune the controllable electromagnetic surface 141 of each antenna module 140. The change of states of controllable elements 141a belonging to the controllable electromagnetic surface 141 is modifying the way the electromagnetic wave is reflected and/or transmitted. This changes the amplitude and/or phase and/or radiation pattern of each electromagnetic wave from each antenna module 140 related to each transceiver 121: This changes the beam B of the electromagnetic wave at each antenna module 140.

The antenna parameters are then determining the way the controllable electromagnetic surface 141 modifies the electromagnetic wave. Therefore, predetermined antenna parameters can be used, for example, to transmit a beam B from any antenna module 140 in any direction or to focalise to any focal point in the environment ENV.

Each antenna module 140 of the plurality of antenna modules is connected to the controller 110 via an antenna link 114, and each antenna module 140 is connected to the radiofrequency module 120 via a waveguide 130. Each antenna link 114 transfers antenna parameters to an antenna module 140. The waveguides 130 transfer electromagnetic wave to an antenna module 140.

In case the controller 110 and the radiofrequency module 120 are integrated into a first device 129, the antenna modules 140 are then connected to the first device via two links or connections; an antenna link 114 and a waveguide 130.

In the embodiment illustrated in FIG. 1, as there are a number of N antenna modules 140 in the plurality of antenna modules, there are also N antenna links 114 between the controller 110 and the plurality of antenna modules 140.

Thanks to the above architecture and links, the radar device 100 is a modular system including the number of antenna modules 140 as needed for its use. Moreover, it may be upgraded to a greater number of antenna modules 140 or downsized to a lower number of antenna modules 140.

In the radar device 100, the radiofrequency module 120 and the plurality of antenna modules 140 are preferably synchronized so that the wave data during emitting or during receiving are processed at a known time instant. Thanks to this feature, time of flight of electromagnetic waves can be determined. Moreover, the antenna parameters can be transmitted to the plurality of antenna modules 140 (and verified to be applied to the antenna modules) before any transmission or receiving of electromagnetic wave is proceeded. The changes of antenna parameters in the antenna modules 140 are then applied without interfering with the transmitting or the receiving of electromagnetic waves.

This synchronization could be necessary for the adequate processing of wave data and for calculating the radar image.

According to an embodiment, the synchronization may be done by a trigger signal or a synchronization signal, such as a clock or time signal shared to the controller 110, the radiofrequency module 120 and the antenna modules 140. All these devices and modules are then synchronized in time.

According to an embodiment, the synchronization may be done by a synchronization signal generated by the controller 110 that is a master in the radar device 100.

Then, the radar device 100 may operate as follow. The processor 111 in controller 110 is processing radar software to determine a radar image of a field of view FOV in the environment ENV. In the processing of said radar software:
   the controller 110 is scanning the field of view FOV in the environment ENV in front of the antenna modules 140 by applying successively a plurality of antenna parameters to each antenna module of the plurality of antenna modules 140,
   the controller 110 is receiving wave data from the radiofrequency module 120 after each step of the scanning; i.e., after each new applying/setting of antenna parameters to the antenna modules 140; and
   the controller 110 is then calculating a radar image on the basis of the wave data received from the radiofrequency module 120, the antenna parameters being successively applied to each antenna module, and some radar parameters.

The antenna parameters applied at each antenna module 140 define the electromagnetic wave emitted by each antenna module 140, and the wave data received by the controller 110 define the received electromagnetic wave in response to the emitted electromagnetic wave.

The radar parameters may include geometric data of the radar device 100: for example, it includes the poses (positions and orientations) of each antenna module 140 relative to a reference device such as the controller 110 or a first antenna module 140 or any other device in the radar device).

The poses of each antenna module 140 may be determined by measurements from sensors and/or from the antenna modules 140 themselves. For example, electromagnetic waves may be sent and received between antenna modules 140 in the radar device (autocalibration). The signals measured from these antenna modules 140 can be used to determine the poses. The measurement of the poses of antenna modules 140 may be determined successively one after the other or simultaneously.

The positions may be determined for example by the time of flight of waves between the sensors or antenna modules. The position may be determined by calculating distances and triangulation between the sensors/antenna modules. Some predetermined information (partial geometric model) may be necessary in these determinations. The orientations may be also determined by these experimentations and measurements.

The positions of antenna modules 140 are then determined by the controller 110 scanning the antenna modules 140 themselves.

The radar parameters may also include time delay values for correction or compensation in the emission of the electromagnetic wave and/or in the receiving of the electromagnetic wave. These time delay values may be determined relative to the synchronization time signal, and they can be determined by calculus or by experimentation on the radar device 100. These time delay values can be applied in the signals and/or during calculation of radar image.

The radar software then includes processing methods to determine and calculate the radar image from all the above information. This may include modelling of electromagnetic wave propagation, modelling of antenna modules and more generally modelling of radar devices. These modelings can be mathematical modeling or experimental modeling. Models can be calibrated on experimental data. Many well-known techniques exist for such radar software to determine the radar image. For example, the wave data received by the radar device for a sequence of illumination are recombined linearly in order to correspond to data from a Multi-Input Multi-Output (MIMO) system. The linear combination corresponds to a matrix multiplication with a passage matrix calibrated on experimental data. After recombination of the data, a three-dimensional Fast-Fourier transform (3D-FFT) is applied along the frequency axis and position of the virtual single element antenna in order to form a radar image of the environment.

According to an embodiment, the scanning of the field of view FOV is operated thanks to the following process in which the controller 110 sends via the antenna link 114 all the antenna parameters.

In this method:
  the memory 112 of the controller 110 is storing the antenna parameters for the tuning of the controllable electromagnetic surface 141 of each antenna module 140, and
  the processor 111 is sending to each antenna module 140 predetermined antenna parameters, so as to apply the antenna parameters to each antenna module 140.

According to another embodiment, the scanning of the field of view FOV is operated thanks to the following process in which the controller 110 sends via the antenna link 114 only identifiers corresponding to antenna parameters, to reduce the quantity of data transferred via the antenna link 114.

In this method:
  the memory 112 of the controller 110 is storing the antenna parameters for the tuning of the controllable electromagnetic surface 141 of each antenna module 140, and is storing identifiers of these antenna parameters,
  each antenna module 140 comprises a memory 142 storing the (same) antenna parameters and identifiers corresponding to said antenna parameters, and
  the processor 111 of the controller 110 is sending to each antenna module 140 a determined identifier of antenna parameters, so as to apply the antenna parameters to each antenna module 140.

The same database of identifier and antenna parameters may be replicated in memories 112 and/or 142 of the controller and antenna modules by the controller 110. Therefore, only the identifiers are sent via the antenna link 114.

According to another embodiment, the scanning of the field of view FOV is secured or controlled by an acknowledgement of success by each antenna module.

In the method, the controller 110 is successively:
  applying the antenna parameters to each antenna module 140,
  waiting for an acknowledgment of success from the antenna modules 140, said acknowledgment of success meaning the antenna parameters are correctly applied by the antenna modules 140, and
  sending wave data to the radiofrequency module 120 if all acknowledgments of success are received.

If the acknowledgments of success are not all received, the configuration of antenna modules 140 are not well defined and an error is generated, and the radar image is not computed.

Thanks to this secured process, the controller 110 knows the state of each antenna module 140 during emission of the electromagnetic wave, and the controller 110 can process the wave data received in response to the emission to calculate a radar image.

The radiofrequency module 120 generates a chirp or burst signal for the transceivers 121 depending on the wave data received from the controller 110 via the data link 113. This signal depends on the radar software used in the controller 110, or depends on a choice from a user, or depends on configuration data.

According to an embodiment, the radar device 100 or more specifically the radio-frequency module 120 further comprises a waveguide multiplexer 122. The waveguide multiplexer 122 comprises a plurality of elements such as switches or circulators, configured to interconnect transceivers 121 and first ends 130a of waveguides 130. The above elements of waveguide multiplexer 122 are for example controlled by configuration data received from the controller 110.

In such embodiment, the elements are connected to transceivers 121 and to first ends 130a of waveguides 130 by additional waveguides, similar to the waveguides 130 connecting the antenna modules 140 to the radiofrequency module 120.

Thanks to the waveguide multiplexer 122, the radar device 100 may be reconfigurable: a transceiver 121 can be disconnected from an antenna module 140 to be connected to another antenna module 140, or a transceiver 121 can be connected to two or more antenna modules 140.

Usual types of waveguides 130 are leaky waveguides, microstrips, coaxial cables, dielectric cables or waveguides, plastic waveguides, flexboard waveguides, and stack materials waveguides. The waveguide 130 is for example a flexible waveguide. A plastic waveguide may be produced with Teflon© (tétra-fluoroethylene) or polyethylene material. This may be an extruded tube.

A radiofrequency chain from a transceiver 121 to an antenna module 140 may be as follow: a microstrip is connecting a channel of a transceiver 121 to a first radiofrequency connector in the radiofrequency module 120, then a flexible waveguide is connecting the first radiofrequency connector to a second radiofrequency connector in the antenna module 140, then a leaky waveguide is connected to said second radiofrequency connector and is extending near the controllable electromagnetic surface 141.

Figure 2:
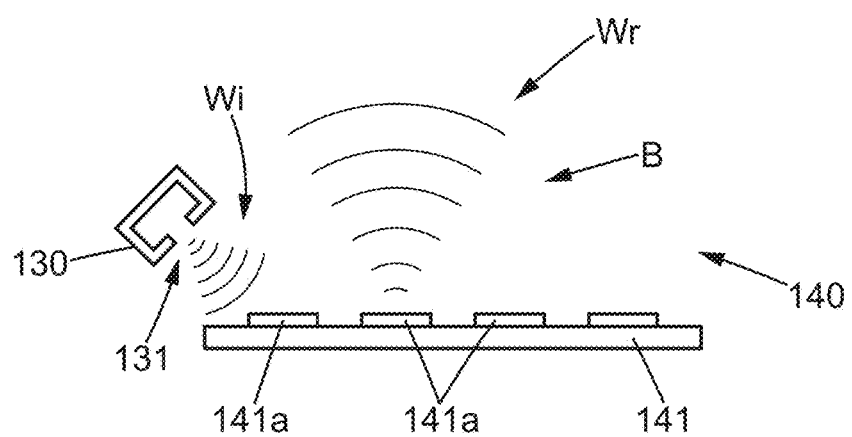
FIG. 2 is a schematic lateral view of an antenna module used in the radar device of FIG. 1.

As illustrated on FIG. 2, the waveguide 130, or an extension of the waveguide 130 inside the antenna module 140 comprises at the second end 130b of the waveguide, a slit 131 in proximity of the controllable electromagnetic surface 141. The waveguide 130 is propagating an electromagnetic wave and the slit is transmitting or receiving an incident electromagnetic wave Wi towards the controllable electromagnetic surface 141. The waveguide 130 is then coupled to the controllable electromagnetic surface 141 of an antenna module 140.

The controllable electromagnetic surface 141 is modifying said incident electromagnetic wave Wi into a reflected electromagnetic wave Wr corresponding to a beam B of the antenna module 140, said beam B propagating from or into far field. Each beam B of an antenna module 140 may comprise one or a plurality of lobes (main lobe and side lobes) as seen in FIG. 1. Each one of these lobes can be controlled independently from the other. Consequently, each one of these lobes can be considered as an independent beam of the radar device. Then, the radar device can scan simultaneously a plurality of spatial directions in the field of view. This radar device is then a multi beam device.

Each antenna module of the plurality of antenna modules $140_1, 140_2, \ldots 140_N$ induces its own beam $B_1, B_2, \ldots, B_N$ as represented on FIG. 1 (in receive or emit mode). Each one of these beams can also comprise a plurality of lobes, and therefore can be a multi-beam as explained above.

The beam B of any antenna module 140 propagates from or into far field by reference of the radar device. However, the radar device may adapt each beam B to any distance range: short range to long range. Consequently, the radar device may scan a large field of view FOV.

According to an embodiment, the antenna module 140 may comprise a reflection cavity 143 and an opening 144. The waveguide 130 that is coupled to the antenna module 140 is transmitting to or receiving from the reflection cavity 143 the electromagnetic wave. The electromagnetic wave inside the reflection cavity 143 impacts a plurality of times the controllable electromagnetic surface 141 before exiting the reflection cavity 143 by the opening 144 or by the waveguide 130.

Thanks to this reflection cavity 143, the electromagnetic wave is then more controllable or tunable. The parameters of antenna module 140 are controlling the states of controllable elements 141a, and these states may change the amplitude and/or phase, and/or radiating pattern of any antenna module 140.

Figure 3:
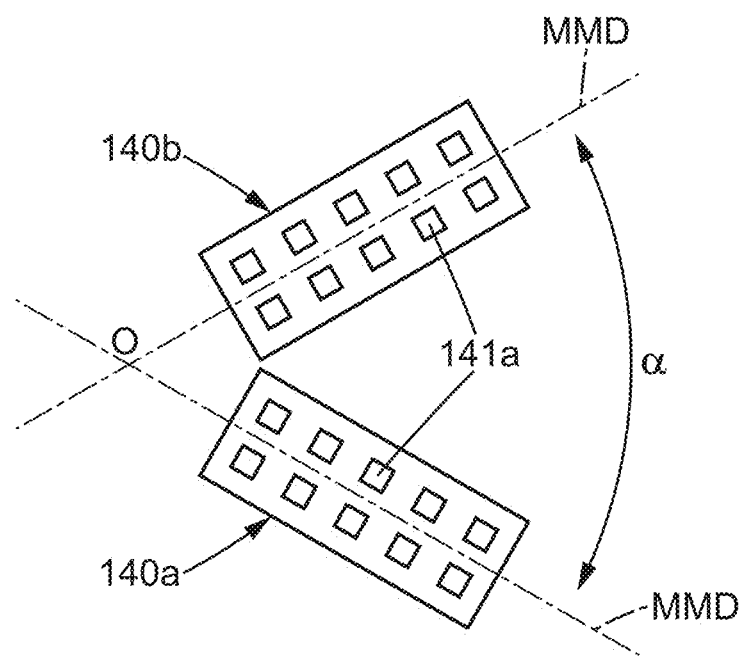
FIG. 3 is a group of two antenna modules used in the radar device of FIG. 1, said group of antenna modules being in a "Mills Cross" configuration.

FIG. 3 illustrates an antenna module 140 according to the disclosure. The antenna module 140 comprises a plurality of controllable elements 141a. The controllable elements 141a are for example spread on an area having a main module direction MMD corresponding to a greatest size of said antenna module 140.

For example, the controllable elements 141a of said antenna module 140 are aligned according to the main module direction MMD, or the controllable elements 141a are organized according to an array of elements, having a plurality of rows aligned according to the main module direction MMD.

According to an embodiment, the antenna modules 140 may be organized according to a "Mills Cross" technique, i.e., in a cross geometry. Such "Mill cross" geometry has similar efficiency compared to full array geometry of controllable elements 141a. But, it has much smaller number of controllable elements 141a.

According to a first variant of this technique, a group of two antenna modules 140a, 140b are angled by a predetermined angle α of 90 degrees (°) or less.

According to a second variant of this technique, a group of two antenna modules 140a, 140b are angled by a predetermined angle α comprised between 10 degrees and 45 degrees. The predetermined angle α is eventually lower than 30 degrees.

Thanks to a reduced angle α, the group of two antenna modules 140a, 140b have a height much lower than its width. The group of two antenna modules can be integrated into slim shapes, with a pretty good sensitivity in all directions.

SHORT NOMENCLATURE 100 radar device
110 controller
111 processor
112 memory
113 a data link
114 antenna link
120 radiofrequency module
121 transceivers
122 waveguide multiplexer
130 waveguides
131 slit
140 antenna module
141 controllable electromagnetic surface
141a controllable elements
142 memory
143 reflection cavity
144 opening

The invention claimed is:

1. A radar device comprising:
   a controller comprising a processor and a memory,
   a radiofrequency module comprising a plurality of transceivers adapted for transmitting or receiving electromagnetic waves,
   a plurality of waveguides, each waveguide of the plurality of waveguides being coupled at a first end of said waveguide to one transceiver of the radiofrequency module, for transmitting or receiving an electromagnetic wave to or from said waveguide,
   a plurality of antenna modules, each antenna module of the plurality of antenna modules being coupled at a second end of each waveguide, for transmitting or receiving the electromagnetic wave between the waveguide and said antenna module, and
   each antenna module having a controllable electromagnetic surface illuminated by the electromagnetic wave to or from the waveguide,
   wherein:
   the controller is connected to the radiofrequency module via a data link to exchange wave data with said radiofrequency module, so that each transceiver can transform said wave data into the electromagnetic wave or transform the electromagnetic wave into wave data,
   the controller is connected to each antenna module via an antenna link to apply antenna parameters to each antenna module for tuning the controllable electromagnetic surface of each antenna module, and
   the controller is scanning a field of view (FOV) in front of the antenna modules by applying successively a plurality of antenna parameters to each antenna module of the plurality of antenna modules.

2. The device according to claim 1, wherein the controller is calculating a radar image based on the wave data received from the radiofrequency module, the antenna parameters being successively applied to each antenna module, and radar parameters.

3. The device according to claim 1, wherein the radio frequency module further comprises a waveguide multiplexer comprising a plurality of elements chosen in a list of switches, and circulators configured to interconnect transceivers and first ends of waveguides, said elements being controlled by configuration data received from the controller.

4. The device according to claim 1, wherein each waveguide is a flexible waveguide.

5. The device according to claim 1, wherein each waveguide is of a type chosen in a list comprising a leaky waveguide, microstrips, coaxial cables, dielectric cables or waveguides, plastic waveguides, flexboard waveguides, and stack materials waveguides.

6. The device according to claim 1, wherein each waveguide comprises at the second end a slit for illuminating the electromagnetic wave towards the controllable electromagnetic surface of the antenna module coupled to said waveguide.

7. The device according to claim 1, wherein each antenna module comprises a reflection cavity and an opening, the electromagnetic wave inside the cavity of the antenna module being multiple times reflected inside said reflection cavity to impact a plurality of times the controllable electromagnetic surface before exiting the reflection cavity by the opening or by the waveguide.

8. The device according to claim 1, wherein the controllable electromagnetic surface of each antenna module comprises a plurality of controllable elements, each controllable element being tunable by a parameter of the antenna parameters.

9. The device according to claim 8, wherein each antenna module comprises a main module direction in which said antenna module has a greatest size.

10. The device according to claim 9, wherein the controllable elements are aligned according to the main module direction, or the controllable elements are organized in an array of elements, having a plurality of rows aligned according to the main module direction.

11. The device according to claim 1, comprising at least a group of two antenna modules, the antenna modules of said group each having a main module direction in which each antenna module has a greatest size, the main directions of the two antenna modules being angled by a predetermined angle (a) comprised between 10 degrees and 30 degrees.

12. The device according to claim 1, wherein:
the memory of the controller stores the antenna parameters for the tuning of the controllable electromagnetic surface of each antenna module, and
the processor sends to each antenna module the antenna parameters, so as to apply the antenna parameters to each antenna module.

13. The device according to claim 1, wherein:
the memory of the controller stores the antenna parameters for the tuning of the controllable electromagnetic surface of each antenna module, and stores identifiers of the antenna parameters,
each antenna module comprises a memory to store antenna parameters of the antenna parameters and identifiers of the identifiers corresponding to the stored antenna parameters, and
the processor of the controller sends to each antenna module a determined identifier of antenna parameters, so as to apply the antenna parameters to each antenna module (140).

14. The device according to claim 1, wherein the processor of the controller is successively:
applying the antenna parameters to each antenna module,
waiting for an acknowledgment of success of the applying of said antenna parameters to each antenna modules, and
sending wave data to the radiofrequency module.

15. The device according to claim 1, wherein radar parameters comprise positions of antenna modules.

16. The device according to claim 15, wherein the positions of antenna modules are determined by the controller scanning the antenna modules one after the other.

* * * * *